United States Patent Office 3,073,693
Patented Jan. 15, 1963

3,073,693
PROCESS FOR PRODUCING A SOLID
NITROGENOUS FERTILIZER
Francis T. Nielsson, Morton Grove, Ill., and Albert J. Soday, East Point, Ga., assignors to International Minerals & Chemical Corporation, a corporation of New York
No Drawing. Filed Aug. 25, 1958, Ser. No. 757,131
5 Claims. (Cl. 71—13)

This invention relates to the composition and preparation of a novel nitrogenous fertilizer material. More particularly, it relates to the utilization of sewage sludge and urea formaldehyde in the preparation of a nitrogenous fertilizer material.

Sewage sludge recovered from municipal disposal systems and from certain industrial waste liquors may contain as much as 5% by weight or more of nitrogen, and has been used as a fertilizer material, particularly on lawns and pastures. However, because of the low nitrogen content of sewage sludge, it has not been economical to ship this material for long distances from the recovery plant. Therefore, unless there is a demand for sewage sludge for use as a fertilizer in the area immediately adjacent to the recovery plant, it is necessary to dispose of the material by burning, burying, or the like. In addition when sewage sludge is used as a fertilizer, offensive odors are generally created, particularly when the material becomes wet. Although sewage sludge contains a slowly soluble form of nitrogen which will not burn the plants, its use as a fertilizer has been limited because of the high cost of transportation and because of offensive odors.

Synthetic nitrogen-containing fertilizers such as urea formaldehyde have also been used to supply nitrogen to the soil, because nitrogen in compounds of this type is present in a form which is slowly soluble in the soil fluids and there is little danger of burning the plants. However, urea formaldehyde is a very expensive source of nitrogen and for this reason its use as a fertilizer has been limited. In addition, over a period of several years urea formaldehyde is completely solubilized in the soil fluids and therefore has little effect upon improving the tilth of the soil. Furthermore, in the preparation of fertilizer grade urea formaldehyde from aqueous solutions of the reactants, dilute solutions and close control of the reaction are required to produce a material containing nitrogen in a form which is insoluble in water and soluble in soil fluids.

It is an object of the present invention to prepare a novel nitrogenous fertilizer material.

A further object of the invention is to prepare a nitrogenous fertilizer material containing a substantial proportion of slowly available nitrogen.

Another object of the invention is to provide a method of preparing a fertilizer material containing urea formaldehyde utilizing relatively concentrated solutions of reactants.

Still another object of the invention is to prepare a nitrogenous fertilizer material, utilizing sewage sludge as one or the components, which will not generate offensive odors on contact with water.

It is another object of this invention to prepare a nitrogenous fertilizer material capable of substantially improving the tilth of the soil.

It is a further object of this invention to prepare a nitrogenous fertilizer material, utilizing sewage sludge as one of the components, in which the nitrogen content is high enough to permit the economical transportation of the fertilizer material for long distances.

These and other objects of the invention will be apparent from the following detailed description.

The instant invention involves the composition and preparation of a novel nitrogenous fertilizer material comprised of sewage sludge, peat moss, urea formaldehyde, and an ammonium salt of a strong mineral acid. In the preparation of the novel fertilizer, sewage sludge, peat moss, and solid urea are admixed with an aqueous solution of urea formaldehyde and an aqueous solution of a strong mineral acid. The reactants are admixed for between about ½ and about 2 minutes, whereby polymerization and condensation of the urea formaldehyde is effected. The resulting mixture is then admixed with an aqueous solution of ammonia whereby further condensation and polymerization of the urea formaldehyde is inhibited. The reactants are admixed for between about ½ and about 2 minutes to produce a substantially homogeneous mixture. The resulting solids mixture, after curing, is a substantially dust-free nitrogenous fertilizer which will not burn the plants and which does not have an offensive odor when contacted with water.

More in detail, solid components such as sewage sludge, peat moss, and solid urea are admixed in a suitable blending apparatus such as a pug mill or pan mixer. The term "sewage sludge" as used throughout the description and claims is intended to include solid sludge recovered from municipal disposal units as well as solid proteinaceous materials recovered from industrial waste liquors formed in the treatment of leather, wool, meat products, and the like. The term "sewage sludge" is further intended to include sludges produced by the "activation method," by the "digestion method," or by modifications of these methods. It is preferred to use an activated sewage sludge containing at least about 5% nitrogen by weight, but sludges containing smaller proportions of nitrogen may be used if desired. In certain instances, depending upon the source of the sewage sludge, phosphates and minor element compounds may be present in small amounts. Since these compounds also aid in plant growth, their presence is desirable.

Peat moss, a material produced by the natural partial carbonization of vegetable and wood materials, is also utilized as a component of the fertilizer in order to enhance the friability of the fertilizer and improve the tilth of the soil. Generally, this material contains between about 0.3 and about 0.7% by weight of nitrogen and between about 35 and 65% by weight of water. The peatm oss is admixed with the sewage sludge in proportions to provide a weight ratio of sewage sludge to peat moss on a bone dry basis of between about 1:1 and about 15:1, and preferably between about 1:1 and about 4:1.

Solid urea is admixed with the sewage sludge and peat moss to provide between about 30 and about 50% by weight of the solids mixture. All of the solid components in the mixture should have a particle size less than about 4 mesh in order to facilitate the preparation of a substantially homogeneous mixture.

After the solid components have been mixed in the above described proportions, an aqueous solution of urea formaldehyde and an aqueous solution of a strong minerl acid are added to the solids mixture. An aqueous solution of urea formaldehyde having a urea to formaldehyde molar ratio of less than about 1.3:1 is utilized in the instant process. Chemical analyses of a typical commercially available aqueous urea formaldehyde solution suitable for use in the preparation of the novel fertilizer is as follows:

| Component: | Proportion by Weight, Percent |
|---|---|
| Urea | 26 |
| Formaldehyde | 59 |
| Water | 15 |

Sufficient aqueous urea formaldehyde solution is added to the solids mixture containing solid urea to provide a urea to formaldehyde molar ratio of between about 1.3:1 and about 1.8:1.

A conentrated aqueous solution of a strong mineral acid is added to the mixture in an amount sufficient to adjust the pH of the aqueous urea formaldehyde solution to between about 1 and about 3. Typical examples of suitable acids are sulfuric acid, phosphoric acid, nitric acid, hydrochloric acid, and the like. It is preferred to use aqueous sulfuric acid having a concentration of between about 75 and about 95% $H_2SO_4$ by weight. The acid is preferably added to the solids mixture after the aqueous solution of urea formaldehdye solution has been admixed with the solids, but the acid may be added simultaneously with the urea formaldehyde solution if desired.

Addition of the strong mineral acid solution to the solids mixture in the presence of the aqueous urea formaldehyde solution and solid urea stimulates condensation and polymerization of the urea and formaldehyde components in the mixture, thereby converting water soluble nitrogen into a water-insoluble but plant available form. The desired degree of polymerization is accomplished after mixing the reactants for between about ½ and about 2 minutes. Solid urea formaldehyde formed in this reaction has a urea to formaldehyde molar ratio of between about 1.3:1 and about 1.8:1, and acts as a binder in the agglomeration of fine particles present in the solid components of the mixture.

After mixing the reactants for the above designated time, sufficient ammonia is added to the mixture to provide at least the stoichiometric proportion required to form an ammonium salt with the anion of the mineral acid present in the mixture. If acids such as nitric acid and hydrochloric acid are used, which contain monovalent anions, the molar proportion of ammonia to monovalent anion should be at least 1:1. If acids such as sulfuric acid and phosphoric acid are used, which contain a divalent and a trivalent anion, respectively, the molar proportion of ammonia to anion should be at least 2:1. Sufficient ammonia is added to produce a fertilizer material in which the ratio of nitrogen derived from organic components to nitrogen derived from inorganic components is between about 8:1 and about 15:1. Addition of ammonia to the mixture in these proportions inhibits but does not completely stop the polymerization of urea and formaldehyde components. However, formation of urea formaldehyde polymers in which the urea to formaldehyde molar ratio is less than about 1.1:1 is prevented. Urea formaldehyde polymers in which the urea to formaldehyde molar ratio is less than about 1.1:1 are undesirable in a fertilizer material since the nitrogen is in a form which is not only water insoluble but is also insoluble in soil fluids and thus unavailable as a plant nutrient.

Ammonia is added to the reactant as an aqueous solution, for example, as an aqueous solution containing in excess of about 20% ammonia by weight. Preferably, an aqueous ammonia-containing solution which also contains soluble urea formaldehyde is used to inhibit polymerization. Chemical analyses of a suitable aqueous ammonia-urea formaldehyde solution is as follows:

| Component: | Proportion by weight, percent |
|---|---|
| Ammonia | 25 |
| Urea | 35.3 |
| Formaldehyde | 11.9 |
| Carbon dioxide | 3.0 |
| Water | 24.8 |

The reaction of the ammonia containing solution with the strong mineral acid in the mixture causes the formation of a solid ammonium salt which also acts as a binder to agglomerate fine solids present in the solid reactants. After addition of the aqueous ammonium-containing solution, the reactants are admixed until substantially homogeneous and then allowed to cure in piles, in a manner similar to the curing of superphosphate, for at least about 24 hours, and preferably at least about 72 hours. In the curing step, the reactions between urea and formaldehyde, and ammonia and mineral acid are substantially complete. Due to the exothermic nature of the reactions, a substantial portion of the water present is evolved, thereby producing a dry, dust-free nitrogenous fertilizer material. If desired, curing of the homogenous mixture may be accomplished by heating the mixture in a rotary kiln or the like at a temperature between about 130° and about 160° F. for between about 15 and about 30 minutes to produce a dry material in substantially less time than is required by curing the solids in piles.

The nitrogenous fertilizer, after curing, is a dry pulverulent material containing nitrogen in excess of about 12% by weight, a major portion of the total nitrogen being present as organic compounds which are slowly available to plants, and a minor portion being present as inorganic compounds which are readily available to plants. The fertilizer will not generate offensive odors when contacted with water, and will not burn grass or plants if applied in excess to the soil. The fertilizer is particularly suitable for soils containing a high proportion of clay, since the sewage sludge and peat moss components of the novel fertilizer substantially improve the tilth of such soils.

The novel fertilizer which generally has a particle size of the order of −6 +30 mesh, can be applied directly to the soil or may be used as the nitrogen component of mixed fertilizers.

The following examples are presented in order to define more clearly the instant novel invention, without any intent to be limited thereby. All parts and percentages are by weight unless otherwise specified.

Raw materials used to prepare nitrogenous fertilizer materials in the following examples were as follows:

(1) Activated sewage sludge containing 6.2% $P_2O_5$, 8.2% water, and 5% nitrogen, 90% of the nitrogen being insoluble in cold water.
(2) Peat moss, a commercially available product of the partial natural carbonization of vegetable and wood, the average nitrogen content being about 0.5% and the average water content being about 50%.
(3) Solid urea, fertilizer grade, containing 45% nitrogen.
(4) Aqueous urea formaldehyde solution containing 26% urea, 59% formaldehyde, and 15% water.
(5) Sulfuric acid, 60° Be.
(6) Aqueous ammonia solution containing 25% ammonia, 35.3% urea, 11.9% formaldehyde, 3.0% carbon dioxide, and 24.8% water.

EXAMPLE I

Activated sewage sludge (520 parts), peat moss (520 parts), and solid urea (553 parts) were admixed in a paddle mixer for about one minute. Aqueous urea formaldehyde solution (368 parts) and sulfuric acid (139 parts) were admixed with the solid materials for about 30 seconds. Aqueous ammonia-containing solution (150 parts) was then admixed with the reagents for about 30 seconds. The resulting mixture was divided into three equal portions designated as portions A, B, and C, respectively. Portion A was stored in a closed container at room temperature for one week. Portion B was stored in a closed container at a temperature of about 150° F. for one week, in order to simulate the temperature conditions which prevail in storage of large quantities of fertilizer materials. Portion C was heated in a rotary dryer having an inlet gas temperature of about 500° F., the temperature of the solids being maintained below 160° F. The ratio of various components in the fertilizer and chemical analysis of the fertilizer are set forth in Table 1.

*Table 1*

| Component | Portion | | |
|---|---|---|---|
| | A | B | C |
| Urea, formaldehyde molar ratio | 1.46 | 1.46 | 1.46 |
| Ammonia, sulfuric acid molar ratio | 2.0 | 2.0 | 2.0 |
| Synthetic organic N, natural organic N molar ratio | 11.1 | 11.1 | 11.1 |
| Solid urea, urea in solution weight ratio | 3.6 | 3.6 | 3.6 |
| Urea, ammonia weight ratio | 18.2 | 18.2 | 18.2 |
| Organic nitrogen, inorganic nitrogen weight ratio | 11.3 | 11.3 | 11.3 |
| Total nitrogen, percent | 19.0 | 20.14 | 21.73 |
| Cold water insoluble N, percent | 9.0 | 12.0 | 9.73 |
| Hot water insoluble N, percent | 5.38 | 6.66 | 6.58 |
| Activity Index | 40.2 | 44.5 | 32.37 |
| Moisture, percent | 13.14 | 5.14 | 9.15 |

For purposes of comparison, activated sewage sludge (1040 parts) and solid urea (150 parts) were admixed in a paddle mixer for about one minute, no peat moss being added to the mixture. The resulting mixture was treated with an aqueous solution of urea formaldehyde, sulfuric acid, and an aqueous ammonia solution in the same proportions and in accordance with the same procedure as set forth above. Upon curing this mixture at either room temperature or at a temperature of 150° F. for one week in accordance with the above procedure, the mixture in each instance (designated as portions H and J, respectively), set up into a hard, solid mass which required grinding before the material could be used as a fertilizer. Eliminating peat moss as one of the components of the fertilizer material, as in portions H and J, adversely affected both the process and the product. Portions A, B, and C, which contained peat moss, were friable mixtures and easy to handle.

EXAMPLE II

Activated sewage sludge (260 parts), peat moss (260 parts), and solid urea (150 parts) were admixed in a paddle mixer for about one minute. Aqueous urea formaldehyde solution, sulfuric acid, and aqueous ammonia solution were added to the solid ingredients in the mixture in the proportions and in accordance with the procedure set forth in Example I. The material was removed from the mixer and divided into two equal portions designated as portions D and E, respectively. Portion D was stored in a closed container in room temperature for one week. Portion E was stored in a closed container and maintained at a temperature of about 150° F. for one week. Ratios of the various ingredients of the fertilizer and chemical analysis of the fertilizer are set forth below in Table 2.

EXAMPLE III

The procedure of Example II was repeated with the exception that the quantity of activated sewage sludge was 840 parts and the quantity of peat moss was 200 parts. The material removed from the mixer was divided into two equal portions designated as portions F and G, respectively, which were cured in the same manner as portions D and E of Example II. The ratios of the various ingredients of the fertilizer and the chemical analysis of the fertilizer are set forth below in Table 2.

*Table 2*

| Component | Portion | | | |
|---|---|---|---|---|
| | D | E | F | G |
| Urea, formaldehyde molar ratio | 1.46 | 1.46 | 1.46 | 1.46 |
| Ammonia, sulfuric acid molar ratio | 2.0 | 2.0 | 2.0 | 2.0 |
| Synthetic organic N, natural organic N molar ratio | 23.0 | 23.0 | 7.5 | 7.5 |
| Solid urea, urea in solution weight ratio | 3.6 | 3.6 | 3.6 | 3.6 |
| Urea, ammonia weight ratio | 18.2 | 18.2 | 18.2 | 18.2 |
| Organic N, inorganic N weight ratio | 10.8 | 10.8 | 11.7 | 11.7 |
| Total nitrogen, percent | 21.00 | 26.01 | 19.74 | 23.07 |
| Cold water insoluble N, percent | 8.00 | 14.30 | 8.35 | 12.35 |
| Hot water insoluble N, percent | 4.54 | 8.48 | 4.81 | 7.09 |
| Activity index | 43.3 | 40.07 | 42.3 | 42.6 |
| Moisture, percent | 13.10 | 5.00 | 12.23 | 3.92 |

The activity index of the nitrogenous fertilizer material prepared in the above examples was determined in accordance with the procedure set forth in Official Methods of Analysis of the Association of Official Agricultural Chemists, eighth edition, 1955, page 16, sections 2.37 and 2.38.

Having thus fully described the invention, what is desired to be secured by Letters Patent is set forth in the appended claims.

We claim:

1. The method of preparing a solid nitrogenous fertilizer material which comprises admixing sewage sludge, peat moss and solid urea in proportions to form a solids mixture in which the weight ratio of sewage sludge to peat moss is between about 1:1 and about 15:1 and the solid urea is present in amount of between about 30% and about 50% by weight of the solids mixture, all of the solid components in said solids mixture having a particle size less than about 4 mesh, subsequently adding and mixing for a period of about ½ minute to about 2 minutes an aqueous solution of urea formaldehyde having a urea to formaldehyde molar ratio of less than about 1.3:1 and an aqueous solution of a strong mineral acid thereto, said aqueous solution of urea formaldehyde being added in proportions to provide a urea to formaldehyde molar ratio in the mixture of between about 1.3:1 and about 1.8:1, said mineral acid solution being added in an amount to adjust the pH of the urea formaldehyde solution to between about 1 and about 3, whereby polymerization and condensation of urea formaldehyde is afforded, adding an aqueous ammonia solution to the resulting mixture in at least the stoichiometric proportion required to form an ammonium salt with the anionic component of the mineral acid present in the mixture, admixing the reactants until a substantially homogeneous mixture containing in excess of about 12% by weight nitrogen is formed, and curing said homogeneous mixture.

2. The process of claim 1 wherein said sewage sludge is activated sewage sludge.

3. The process of claim 1 wherein said mineral acid is sulfuric acid, and said ammonium salt is ammonium sulfate.

4. The process of claim 1 wherein said homogeneous mixture is cured for at least 3 days prior to using as a fertilizer.

5. The process of claim 1 wherein said homogeneous mixture is heated to a temperature between about 130° F. and about 160° F. for between about 15 and about 30 minutes prior to using as a fertilizer.

References Cited in the file of this patent

UNITED STATES PATENTS

| | | |
|---|---|---|
| 2,102,830 | Brill | Dec. 21, 1937 |
| 2,220,134 | Townsend | Nov. 5, 1940 |
| 2,255,026 | Keenan | Sept. 2, 1941 |
| 2,618,546 | Davenport | Nov. 18, 1952 |
| 2,827,368 | Mortensen et al. | Mar. 18, 1958 |
| 2,861,877 | Geraghty | Nov. 25, 1958 |
| 2,955,930 | Kealy | Oct. 11, 1960 |